(12) United States Patent
Lee et al.

(10) Patent No.: US 11,110,472 B2
(45) Date of Patent: Sep. 7, 2021

(54) PUMP HEAD AND METERING DEVICE

(71) Applicant: F. Holzer GmbH, St. Ingbert (DE)

(72) Inventors: Hyek Hee Lee, St. Ingbert (DE); Ute Steinfeld, St. Ingbert (DE); Markus Mahler, Völklingen (DE); Frank Holzer, St. Ingbert (DE)

(73) Assignee: F. Holzer GmbH, St. Ingbert (DE)

( * ) Notice: Subject to any disclaimer, the term of this patent is extended or adjusted under 35 U.S.C. 154(b) by 0 days.

(21) Appl. No.: 16/317,266

(22) PCT Filed: Jun. 1, 2017

(86) PCT No.: PCT/EP2017/063342
§ 371 (c)(1),
(2) Date: Jan. 11, 2019

(87) PCT Pub. No.: WO2018/010889
PCT Pub. Date: Jan. 18, 2018

(65) Prior Publication Data
US 2019/0224705 A1    Jul. 25, 2019

(30) Foreign Application Priority Data
Jul. 14, 2016    (DE) ..................... 10 2016 212 893.0

(51) Int. Cl.
*B05B 11/04*    (2006.01)
*B05B 11/00*    (2006.01)
(Continued)

(52) U.S. Cl.
CPC .......... *B05B 11/047* (2013.01); *B05B 11/007* (2013.01); *G01F 11/04* (2013.01);
(Continued)

(58) Field of Classification Search
CPC . B05B 11/047; B05B 11/007; B05B 11/0067; B05B 11/048; B05B 11/3016; G01F 11/04; G01F 11/082; B65D 47/247
See application file for complete search history.

(56) References Cited

U.S. PATENT DOCUMENTS 1,592,402 A    7/1926    Wilcox, Jr.
1,621,097 A    3/1927    Zammataro
(Continued)

FOREIGN PATENT DOCUMENTS

CN    101542242 A    9/2009
CN    103168215 A    6/2013
(Continued)

OTHER PUBLICATIONS

"International Application No. PCT/EP2017/063342, International Search Report dated Aug. 10, 2017", (Aug. 10, 2017), 3 pgs.
(Continued)

*Primary Examiner* — J C Jacyna
(74) *Attorney, Agent, or Firm* — Schwegman Lundberg & Woessner, P.A.

(57) ABSTRACT

The present invention relates to a pump head that enables a metered dispensing of fluids. The present invention also relates to a metering apparatus that can, for example, be configured as a squeeze bottle, wherein the metering apparatus comprises a pump head in accordance with the invention.

20 Claims, 9 Drawing Sheets

(51) Int. Cl.
*G01F 11/08* (2006.01)
*G01F 11/04* (2006.01)

(52) U.S. Cl.
CPC ......... *G01F 11/082* (2013.01); *B05B 11/0067* (2013.01); *B05B 11/048* (2013.01); *B05B 11/3016* (2013.01)

(56) References Cited

U.S. PATENT DOCUMENTS

| | | | |
|---|---|---|---|
| 2,015,794 A | 10/1935 | Gray | |
| 2,026,234 A | 12/1935 | Knuutila | |
| 2,270,794 A | 1/1942 | Bela | |
| 2,936,935 A * | 5/1960 | Rabb | B65D 47/247 222/525 |
| 3,008,611 A | 11/1961 | Mancusi, Jr. | |
| 3,401,719 A | 9/1968 | Rosser | |
| 3,746,261 A | 7/1973 | Nozawa et al. | |
| 3,759,425 A | 9/1973 | Lee | |
| 4,102,476 A | 7/1978 | Loeffler | |
| 4,420,101 A | 12/1983 | Oneill | |
| 5,819,990 A | 10/1998 | Cimentepe et al. | |
| 6,332,730 B1 | 12/2001 | Taghavi-khanghah | |
| 6,695,173 B1 | 2/2004 | Fontana | |
| 7,249,694 B2 | 7/2007 | Masuda | |
| 2002/0014499 A1* | 2/2002 | Bonningue | G01F 11/04 222/185.1 |
| 2006/0186139 A1 | 8/2006 | Laidler et al. | |
| 2006/0231579 A1* | 10/2006 | Carter | G01F 11/04 222/389 |
| 2009/0008413 A1 | 1/2009 | Choi et al. | |
| 2009/0294347 A1* | 12/2009 | Wochele | B05B 11/00444 210/244 |
| 2009/0321479 A1 | 12/2009 | Fontana | |
| 2011/0084098 A1* | 4/2011 | Py | B29B 11/08 222/207 |
| 2011/0089191 A1 | 4/2011 | Altonen et al. | |
| 2011/0240677 A1 | 10/2011 | Dwyer | |
| 2013/0200110 A1 | 8/2013 | Lee et al. | |
| 2014/0231462 A1* | 8/2014 | Ray | A47K 5/122 222/207 |
| 2018/0229247 A1 | 8/2018 | Laidler | |
| 2018/0236466 A1 | 8/2018 | Laidler | |
| 2019/0016509 A1 | 1/2019 | Bloc et al. | |
| 2019/0212179 A1* | 7/2019 | Lee | B05B 11/0067 |
| 2019/0283056 A1* | 9/2019 | Ki | A45D 34/04 |
| 2019/0283060 A1* | 9/2019 | Ki | B05B 11/3022 |

FOREIGN PATENT DOCUMENTS

| | | |
|---|---|---|
| CN | 105057139 A | 11/2015 |
| DE | 3102346 A1 | 9/1982 |
| DE | 10200519 A1 | 7/2003 |
| DE | 102009048476 B3 | 9/2010 |
| DE | 102014221393 A1 | 4/2016 |
| EP | 1084764 A1 | 3/2001 |
| EP | 1164362 A1 | 12/2001 |
| EP | 2383553 A1 | 11/2011 |
| JP | H11240553 A | 9/1999 |
| JP | 2008265802 A | 11/2008 |
| WO | WO-9005091 A1 | 5/1990 |
| WO | WO-0037179 A1 | 6/2000 |

OTHER PUBLICATIONS

"International Application No. PCT/EP2017/063342, Written Opinion dated Aug. 10, 2017", (Aug. 10, 2017), 7 pgs.

"Chinese Application Serial No. 201780054341.9, Office Action dated Oct. 29, 2020", w/ English Translation, (Oct. 29, 2020), 11 pgs.

Peng, Min, "Parametric Design of Axial Flow Pump and Analysis of Stress and Modal Characteristics", Chinese Journal of Computational Mechanics, Issue 1, vol. 33, (Feb. 29, 2016), 122-126.

Zhang, Xu, "Development on Infusion System of Portable Human Body Automatic Infusion", Microcontrollers & Embedded Systems, Issue 12, (Dec. 31, 2015), pp. 62-65.

"U.S. Appl. No. 16/315,364, Final Office Action dated Mar. 10, 2021", 12 pgs.

"U.S. Appl. No. 16/315,364, Non Final Office Action dated Aug. 5, 2020", 21 pgs.

"U.S. Appl. No. 16/315,364, Notice of Allowance dated Jun. 8, 2021", 8 pgs.

"U.S. Appl. No. 16/315,364, Preliminary Amendment filed Jan. 4, 2019", 9 pgs.

"U.S. Appl. No. 16/315,364, Response filed May 10, 2021 to Final Office Action dated Mar. 10, 2021", 9 pgs.

"U.S. Appl. No. 16/315,364, Response filed Nov. 5, 2020 to Non Final Office Action dated Aug. 5, 2020", 17 pgs.

"Australian Application Serial No. 2017295387, Office Action dated May 14, 2021", (May 14, 2021), 3 pgs.

"Chinese Application No. 201780043716.1, Office Action dated Jan. 3, 2020", w/English Translation, (Jan. 3, 2020), 21 pgs.

"Chinese Application Serial No. 201780043716.1, Office Action dated Apr. 9, 2021", w/English Translation, (Apr. 9, 2021), 7 pgs.

"Chinese Application Serial No. 201780043716.1, Office Action dated Sep. 23, 2020", w/English Translation, (Sep. 23, 2020), 9 pgs.

"German Application Serial No. 10 2016 212 892.2, Decision to Grant dated Oct. 4, 2017", (Oct. 4, 2017), 9 pgs.

"German Application Serial No. 10 2016 212 892.2, Office Action dated Mar. 13, 2017", w/English Translation, (Mar. 13, 2017), 12 pgs.

"Indian Application Serial No. 201917001023, Office Action dated Jun. 7, 2021", (Jun. 7, 2021), 6 pgs.

"International Application Serial No. PCT/EP2017/063346 International Preliminary Report on Patentability dated Jan. 24, 2019", 9 pgs.

"International Application Serial No. PCT/EP2017/063346, International Search Report dated Aug. 17, 2017", w/ English Translation, (Aug. 17, 2017), 9 pgs.

"International Application Serial No. PCT/EP2017/063346, Written Opinion dated Aug. 17, 2017", (Aug. 17, 2017), 7 pgs.

\* cited by examiner

PUMP HEAD AND METERING DEVICE

PRIORITY APPLICATIONS

This application is a U.S. National Stage Filing under 35 U.S.C. 371 from International Application No. PCT/EP2017/063342, filed on Jun. 1, 2017, and published as WO2018/010889 on Jan. 18, 2018, which claims the benefit of priority to German Application No. 10 2016 212 893.0, filed on Jul. 14, 2016; the benefit of priority of each of which is hereby claimed herein, and which applications and publication are hereby incorporated herein by reference in their entirety.

BACKGROUND

The present invention relates to a pump head that enables a metered dispensing of fluids. The present invention also relates to a metering apparatus that can for example, be configured as a squeeze bottle, wherein the metering apparatus comprises a pump head in accordance with the invention.

SUMMARY

Metering systems are known from the prior art such as squeeze bottles, non-airless systems or airless systems. These systems are characterized by a portioned metering of fluid to be dispensed or by a continuous dispensing of fluid on application of a corresponding pressure on the metering apparatus.

It is, however, still disadvantageous, in particular with squeeze bottles, that a metered dispensing of liquids is not possible. As long as a user exerts pressure on the squeeze bottle, it will dispense the fluid to be metered. On a careless handling, for example on application of excessive pressure on the squeeze bottle by the user, this can have the result that too much liquid is unintentionally discharged from a corresponding metering apparatus.

It is therefore the object of the present invention to provide a pump head, in particular for a squeeze bottle metering system, with which a metered dispensing of the contained fluid is made possible from a metering apparatus, in particular from a squeeze bottle provided with a pump head.

This object is achieved with respect to a pump head and a metering apparatus.

The present disclosure thus relates to a pump head for a metering apparatus for a metered dispensing of a fluid comprising a head part ("head base") having an outlet opening for the fluid to be dispensed; a first element 60 that has a cut-out, a wall bounding the cut-out at one side, and a passage opening introduced into the wall that brings the cut-out directly or indirectly into fluidic communication with the outlet opening of the head part, with the first element 60 being directly or indirectly connected to the head part in the direction of the wall; and a hollow piston having a passage channel that is fit into place in the cutout and is movably guidable up to the wall in the cut-out, with the passage channel being arranged in the hollow piston such that the passage opening is closable by the hollow piston on a movement of the hollow piston in the direction of the wall.

The present disclosure thus provides that the hollow piston that is located in the first element 60 is movably guided. A volume is thus defined by the hollow piston in the cut-out of the first element 60 that can be reduced on a movement of the hollow piston (by application of pressure of the fluid to be dispensed). The fluid located within this volume is thereby dispensed through the passage opening of the first element 60 in the direction of the outlet opening and thus to the outside. However, in its final position at the end of the metering procedure, the hollow piston closes the passage opening of the first element 60 so that an automatic end of the metering procedure takes place. The pump head of the present disclosure thus makes a metered dispensing of the fluid possible. In this respect, only the liquid volume is dispensed that is located in a storage position in the cut-out of the first element 60.

The outlet opening can be configured here so that the fluid can be dispensed by means of the pump head in the form of drops or in the form of a spray.

Another example provides that the cut-out and the hollow piston are cylindrical.

A example provides that the passage channel ends in the direction of the wall in an aperture arranged concentrically or eccentrically with respect to an axial projection of the hollow piston and/or that the passage channel is guided in a straight line and concentrically or eccentrically with respect to an axial projection of the hollow piston and that the passage opening is arranged offset with respect to the aperture.

It is furthermore of advantage if the first element 60 comprises at least one means for fixing to a storage vessel, in particular a latch connection, a snap-in connection, or a thread.

On a direct connection of the head part to the first element 60, the head part and the first element 60 can comprise means for a direct connection, e.g. a latch connection, a snap-in connection, or a thread.

A further example provides that the head part and the first element 60 are indirectly connected to one another, with the head part having an inner surface;
that an elastic valve is incorporated that at least regionally has a geometrical configuration corresponding to the inner surface of the head part (10);
and that a "liner" 40 is incorporated that has a passage opening for the fluid to be dispensed via which an inflow of the fluid between the head part and the elastic valve is made possible while deforming the elastic valve while forming an intermediate space between the elastic valve and the head part (actuation state (B)),
wherein the head part and the first element 60 are connected with shape matching and a force fit while enclosing the elastic seal between the head part and the first element 60 and the elastic valve lies over the full area with a shape match on the inner surface of the head part in a storage state A of the pump head so that a fluidic seal between the head part and the first element 60 is ensured; and wherein the first element 60 is connected at its end remote from the elastic seal to the first element 60.

In accordance with this example, the head part and the elastic valve are thus matched to one another. The elastic valve here lies on the inner surface of the head part so that a complete closure of the outlet opening is ensured. Due to the fact that the elastic valve is at least regionally elastic, the elastic valve lies over its full area on the inner surface of the head part so that no remaining intermediate space is left between the head part and the elastic valve in the storage state. All the liquid to be metered is thus output from the pump head via the outlet opening at the end of the metering process, i.e. when the pump head returns from an actuation state into a storage state.

An example provides that the elastic valve comprises a head and an elastic wall, wherein the head has a geometrical configuration corresponding to the inner surface of the head part and the elastic wall is deformable.

In accordance with this example, the wall of the elastic valve is in particular elastic, whereas the head can be rigid and is thus directly adapted to the configuration of the inner surface of the head part. A secure engagement of the head of the elastic valve in the inner surface of the head part is thus ensured in the region of the outlet opening.

In another example, the elastic wall has at least one desired kink point at which the elastic wall kinks down or in on a movement from the storage state (A) to the actuation state (B).

The wall of the elastic valve can be configured, for example, in the form of bellows. The wall of the elastic valve thus kinks at the desired kink points in the operating state, whereas a stretching of the wall takes place in the storage state so that the wall equally lies on the inner surface of the head part.

It is advantageous in this respect if the elastic wall is formed from a film of an elastically deformable material, in particular from a thermoplastic, rubber and/or silicone, preferably having a thickness of 0.03 to 1 mm, preferably 0.08 to 0.5 mm, particularly preferably 0.20 to 0.30 mm, and/or the head is configured massive.

The head of the elastic valve can preferably be formed from the same material as the elastic wall. The head and the elastic wall are in particular formed in one piece and are in particular manufactured simultaneously by an injection molding process.

In an example, the elastic valve has at least one fixing member via which the elastic valve is connected with force-fit to at least one corresponding fixing member of the liner 40, with the fixing member of the elastic valve and the fixing member of the first liner 40 preferably being configured as a latch connection or a snap-in connection.

In an example, the first liner 40 has a wall that terminates the intermediate space, with a fluidic communication of the intermediate space with a region disposed at the other side of the wall, viewed from the intermediate space, being made possible via the passage opening.

In accordance with this example, separate regions can be formed within the pump head via which a reliable metering of the liquid is possible.

In an example, provision is made that the passage opening is led directly from the region through the wall and opens into the region or is led through a lateral wall of the liner 40 in the region and is guided at an outer surface of the first liner 40 in a notch that can be bounded by the first element 60 and is again led in the region through the lateral wall of the liner 40 and opens into the region.

In particular the last-named possibility, according to which a notch is provided in the outer surface of the first element 60 makes possible a preferred guidance of the fluid in the intermediate space between the head part and the elastic valve.

In an example, a member that exerts a return force on the elastic valve is arranged between the elastic valve and the first liner 40, with the return force having the effect that the intermediate space formed in the actuation state B is closed while returning to the storage state A. The member is in particular a spring.

It is further advantageous in this respect that the first liner 40 is connected at its end remote from the elastic seal to a first element 60 via which the pump head (I) is connectable to a storage vessel (II) for storing the fluid to be dispensed.

It is advantageous if at least one means for the sterile filtration of incoming air is present between the liner 40 and the first element 60 (non-airless system), in particular a bacterial filter, or the liner 40.

The pump head configured for non-airless systems can here in particular be used with squeeze bottles or corresponding metering apparatus having a pump head.

A passive actuation of the pump head takes place here with squeeze bottles since the fluidic pressure takes place by actuation of the squeeze bottle connected to the pump head.

The liner 40 can here be fixed with respect to the first element 60. This embodiment is in particular advantageous for metering apparatus that comprise a squeeze bottle.

A further example provides that when the pump head is connected to the storage vessel via the first element 60, a seal is arranged between the first element 60 and the storage vessel.

The head part can preferably contain an antibacterial material preferably metals or metal ions, and can in particular contain silver particles or silver ions. The head part is in particular manufacturable in an injection molding process, with an antibacterial material in particular being able to be directly compounded with the thermoplastic material that is used to manufacture the injected molded part.

The invention also relates to a metering apparatus that comprises a pump head as described above. The pump head is connected to a storage vessel.

The storage vessel can preferably be configured as a squeeze bottle.

The pump head is in particular suitable for non-airless systems, in particular for metering apparatus that have a squeeze bottle. Solutions containing preserving agents can preferably be stored in such metering apparatus, but in particular solutions free of preserving agents.

BRIEF DESCRIPTION OF THE DRAWINGS

The present invention will be described in more detail with reference to the enclosed Figures without restricting the invention to the specifically shown embodiments.

FIG. 8a represents an enlarged detail of the metering apparatus shown in FIG. 8b.

DETAILED DESCRIPTION

Figure 1:
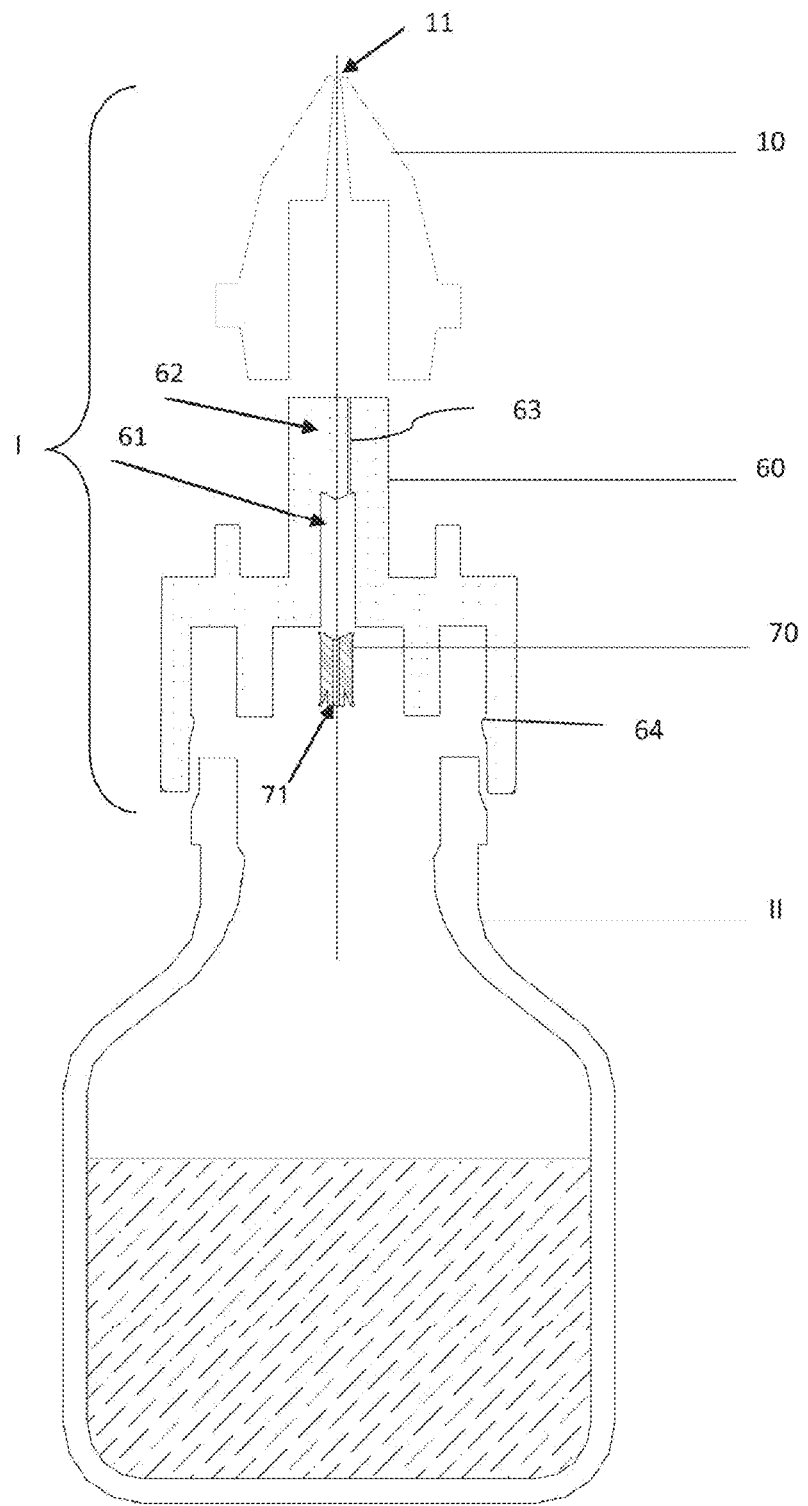
FIG. 1 illustrates an exploded drawing of a metering apparatus that is configured as a squeeze bottle that can be actuated in a meterable manner.

FIG. 1 shows an exploded drawing of a metering apparatus that is configured as a squeeze bottle that can be actuated in a meterable manner. The metering apparatus has a pump head I and a squeeze bottle II (storage vessel) in which a fluid to be dispensed is contained, shown hatched.

The pump head I is in this respect formed from a head part 10 that can be placed on a first element 60. The fluid can, for example, exit the metering apparatus in drop form via the outlet opening 11 provided in the head part 10. The first element 60 here has a cut-out 61 in which a movably guidable hollow piston 70 is fit into place. The first element 60 is bounded by a wall 62 with respect to the head part 10. The piston 70 has a passage channel 71 that is arranged centrally in the piston in the case shown by way of example in FIG. 1. The fluidic communication between the interior of the squeeze bottle II and the outlet opening 11 in the pump head I takes place via the passage channel 71 of the hollow piston, a passage opening 63 in the wall 62 of the first element 60, and the outlet opening 11 itself. As can be recognized from FIG. 1, the passage opening 63 is here arranged eccentrically to the axis shown longitudinally in FIG. 1. For the case that the movable hollow piston 70 is led up to the wall 62, the passage opening 63 is closed by the hollow piston 70. No further liquid can thus be dispensed by the pump head I, even on a longer application of pressure to the squeeze bottle. The pump head thus closes itself in the metering process. The function of the pump head as shown in FIG. 1 will be explained in more detail in the following FIGS. 2 to 4.

Figure 2:
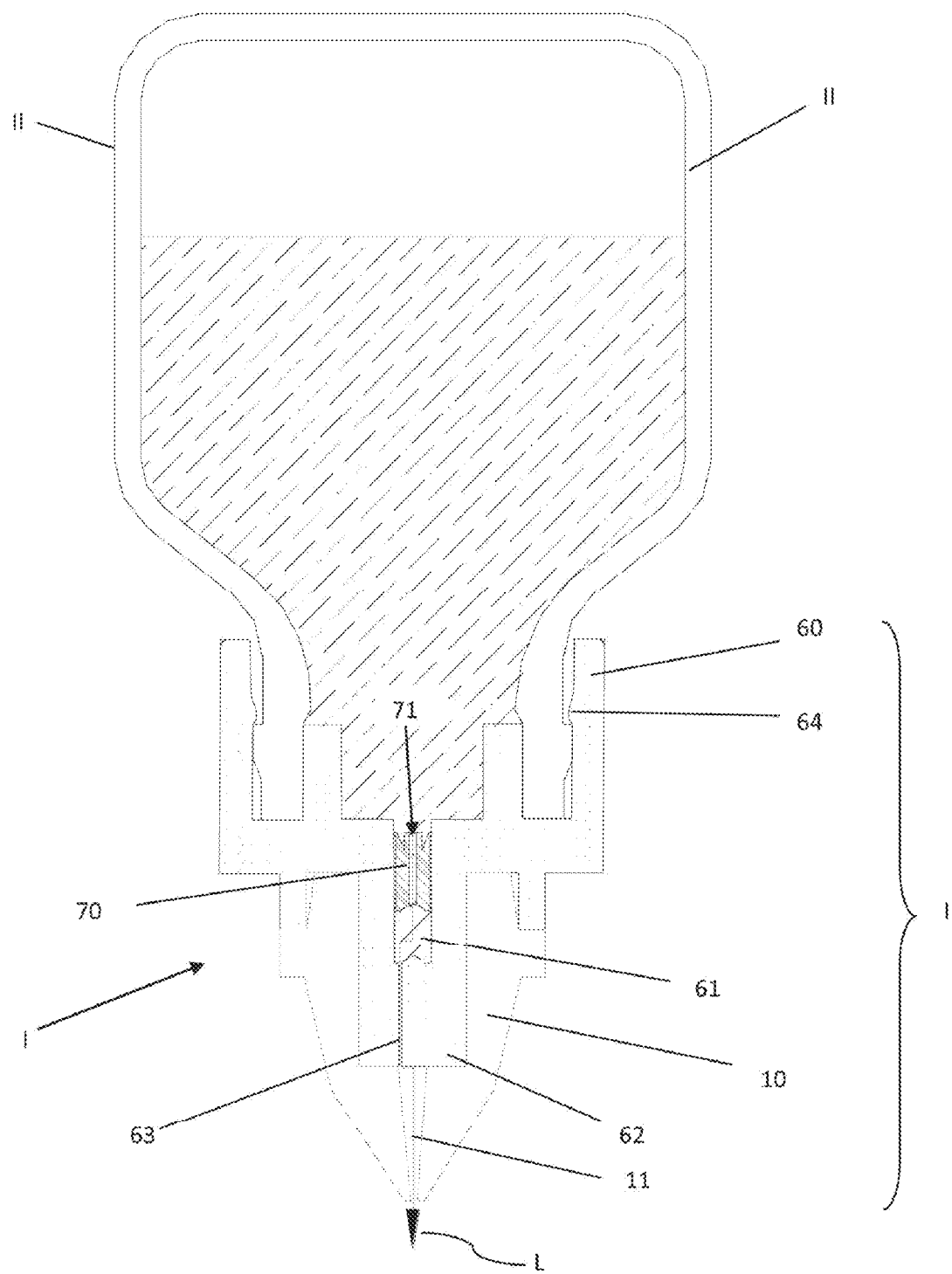
FIG. 2 illustrates an example of a metering apparatus in in an assembled state.

FIG. 2 shows the metering apparatus in accordance with FIG. 1 in the assembled state. The same reference numerals are used in FIG. 2 as in FIG. 1. The metering apparatus is placed on its head for the dispensing of liquid so that cut-out 61 present between the hollow piston 70 in the storage state and the wall 62 of the second portal 60 can be filled with fluid via the channel 71.

Figure 3:
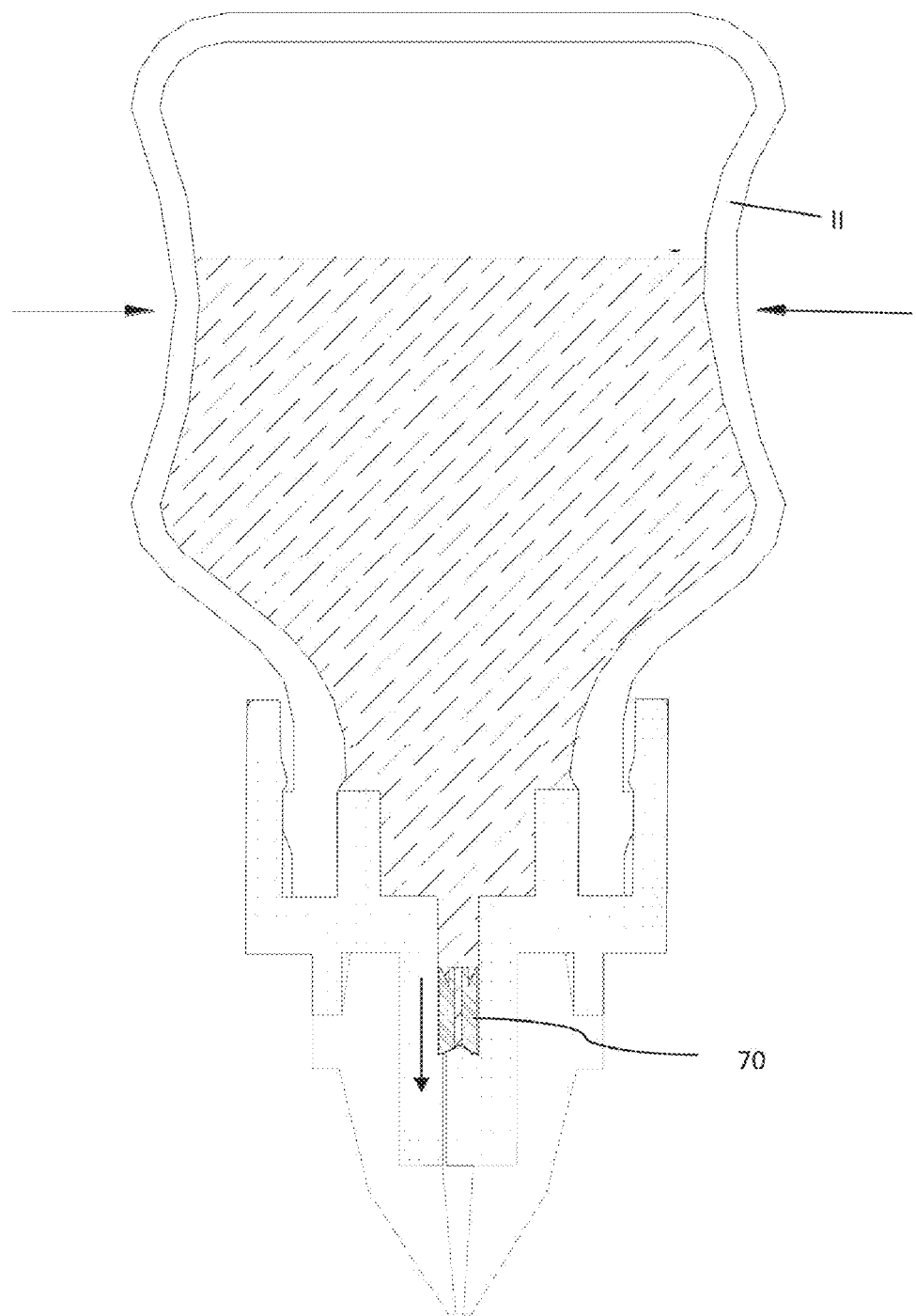
FIG. 3 illustrates an example of a metering apparatus in accordance with FIG. 1 in an actuation state.

If now, as shown in FIG. 3, a pressure is exerted on the squeeze bottle II (indicated for the squeeze bottle II in FIG. 3 by the horizontal arrows), the pressure has the effect that the hollow piston 70 moves downward, as shown by the arrow in FIG. 3. The liquid present in the cut-out 61 bounded in FIG. 2 by the hollow piston 70 and the wall 62 is thus pressed to the outside in or from the outlet opening 11 through the passage opening 63 of the first element 60. At the end of the metering process, i.e. when the hollow piston 70 abuts up to the wall 62 of the first element 60, the passage opening 63 of the first element 60 is closed by the hollow piston 70 so that no further dispensing of the fluid is possible. This state (actuation state) is shown in FIG. 3.

Figure 4:
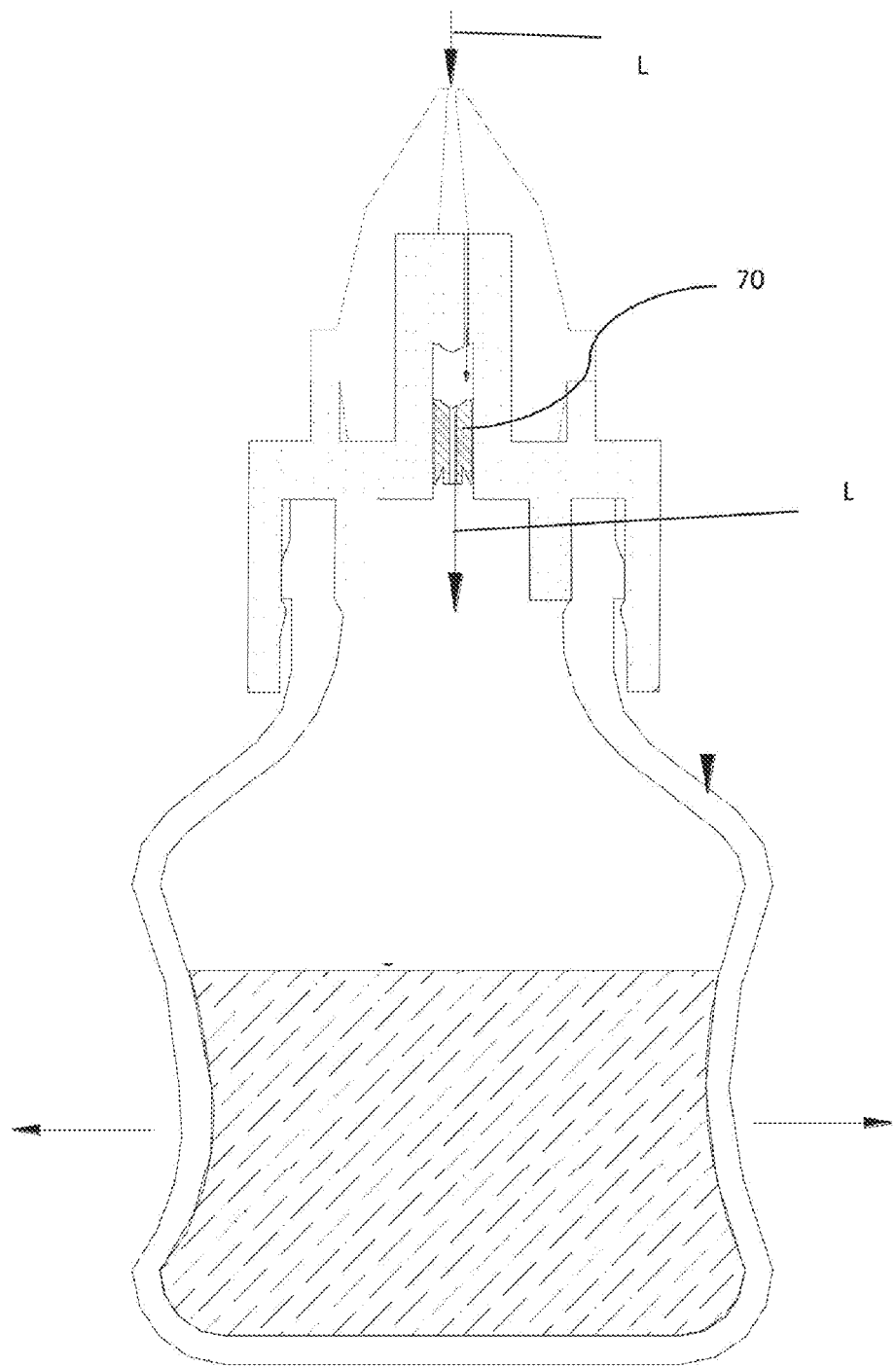
FIG. 4 illustrates an example of a metering apparatus being released and in transition from an actuation state into a storage state.

FIG. 4 shows the situation that occurs when the metering apparatus is released and is thus transitioned from the actuation state (as shown in FIG. 3) into the storage state. Due to the returning force (horizontal arrows at the level of the squeeze bottle II in FIG. 4), a pressure equalization takes place so that air L enters into the bottle. The hollow piston 70 is returned to its starting position here, i.e. the hollow piston 70 moves downward.

Figure 5:
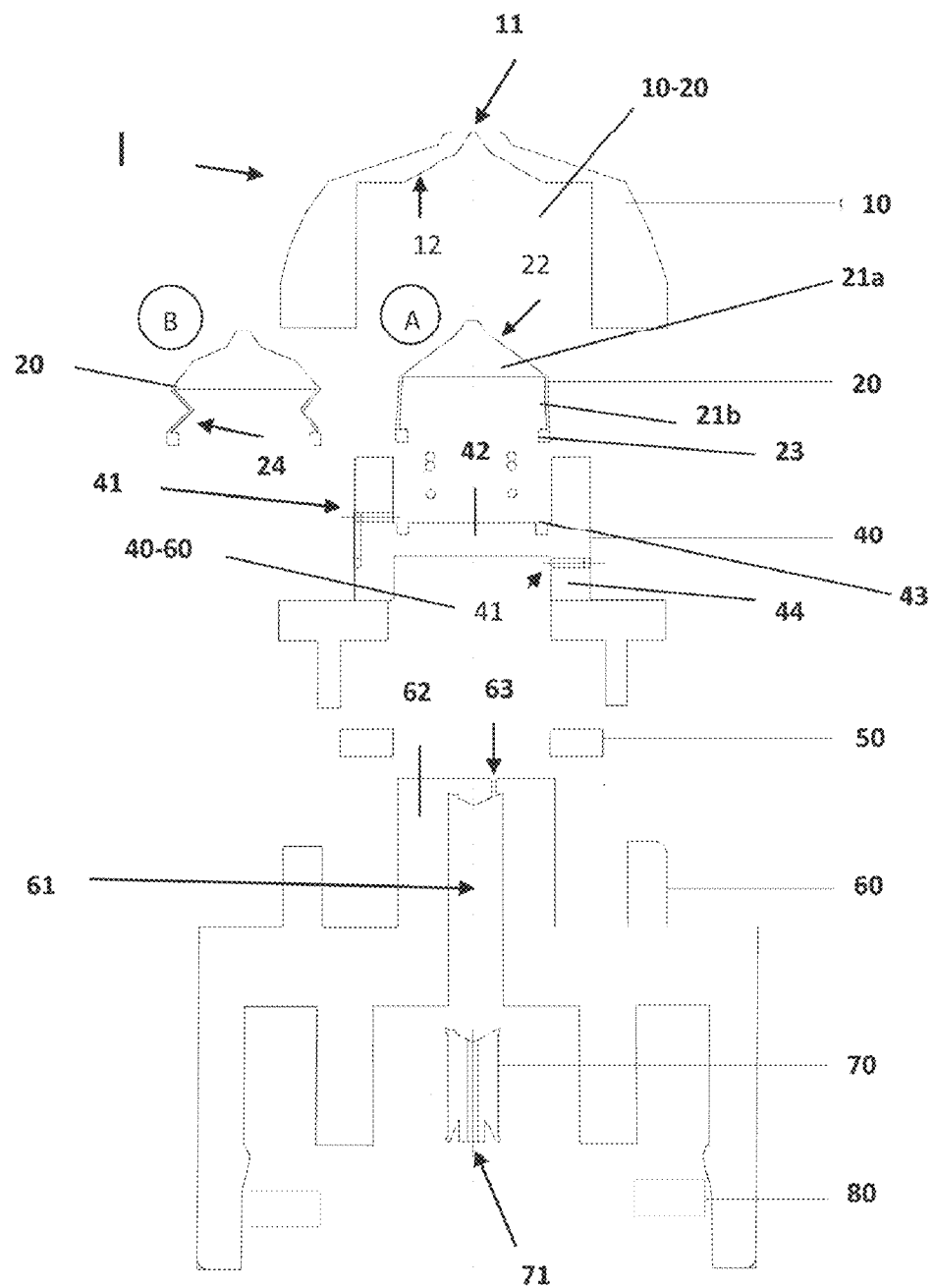
FIG. 5 illustrates an example of a pump head that as a metering head for a squeeze bottle.

FIG. 5 shows a further pump head I that is equally suitable as a metering head for a squeeze bottle. The pump head I here comprises a head part 10 having an outlet opening 11 that can preferably be configured for a drop-like dispensing of fluids. It is, however, equally possible to configure the outlet opening such that an atomized spray can be generated on the dispensing of the fluid. The head part 10 is here seated directly on liner 40 and is connected thereto with shape matching and force fitting. The head part 10 here has an inner cut-out that has an inner surface 12. An elastic valve 20 that has a head 21a and an elastic wall 21b is arranged between the head part 10 and the liner 40. The valve 20 is shown in a storage state (A) and in an actuation state (B). It can be recognized that the elastic wall 21b kinks inward in the actuation state (B); for this purpose the elastic wall 21b preferably has a desired kink point 24 that can be seen in the actuation state (B). The desired kink points 24 are drawn smooth in the storage state (A). The head 21a of the valve 20 can be solid here and the elastic wall 21a can be joined to the head 21a as a tubular wall. The completely elastic valve 20 can be manufactured in one piece in an injection molding process. Fixing members 23, for example a peripheral spring, are present at the elastic wall 21b. The elastic valve 20 is fixed to the liner 40 via the fixing members 23. For this purpose, the fixing members 23 are latched into corresponding fixing members 43, for example a peripheral groove, of the liner 40. The connection of the fixing members 23 and 43 is here designed as sealing with respect to the fluids to be metered. The surface 22 of the head 21a of the valve 20 in this respect has an identical design to the inner surface 12 of the head part 10 so that the head 21a of the valve 20 can be engaged with force matching into the head part 10 in the storage state A and thus completely closes the outlet opening 11. The intermediate space 10-20 formed in the actuation state B between the head part 10 and the elastic valve 20 is hereby completely closed; all the fluid that is present in the intermediate space 10-20 between the head part 10 and the elastic valve 20 in the actuation state is thus discharged from the outlet opening 11 on the transitioning of the pump head into the storage state. The liner 40 has a wall 42 that constructionally separates the pump head into an upper part (the part that comprises the head part and the elastic valve 20) and a lower part (below the wall 42). A first element 60 that is connectable to the liner 40 with force transmission is inserted below the wall 42 of the liner 40. An intermediate space 40-60 results between the first element 60 and the liner 40. The liner 40 here has a passage opening 41 that is configured in the case shown by way of example in FIG. 5 such that the passage opening 41 is led through the wall 44 of the liner 40 in the lower part of the liner 40 (at the level of the intermediate space 40-60) and is there led around the liner 40 in a notch (not shown) on the outer surface of the liner 40. The notch here communicates with a channel that is shown at the left in FIG. 5, that leads upward, and that opens in a further passage opening 41 through which the fluid can be conducted into the intermediate space 10-20 between the valve 20 and the head part 10. The channel guided on the surface of the liner 40 is here bounded and terminated by the placed-on liner 40.

The first element 60 has a wall 62 that is attached at the head side and into which an eccentric transit opening 63 is inserted. The first element 60 is here inserted so far into the liner 40 that the wall 62 in not directly terminated by the wall 42 of the liner 40, but rather that a remaining intermediate region 40-60 is maintained and the transit opening 41 that is arranged in the lower part of the liner 40 thus remains open. In the exemplary case of the pump head I in accordance with FIG. 5, a material 50 is attached between the liner 40 and the first element 60 that filters bacteria and via which an exchange of air of the inwardly disposed region of the pump head with the environment is possible. The first element 60 has a cut-out 61 into which a hollow piston 70 having an inner hollow volume 71 is introduced. The hollow piston 70 is here arranged movable in the cut-out 61 in the axial direction (to the top and bottom in FIG. 5). In addition, the pump head can have a sealing member 80 via which a sealing attachment of the pump head I to a storage vessel II, not shown in FIG. 5, is possible.

Figure 6A:
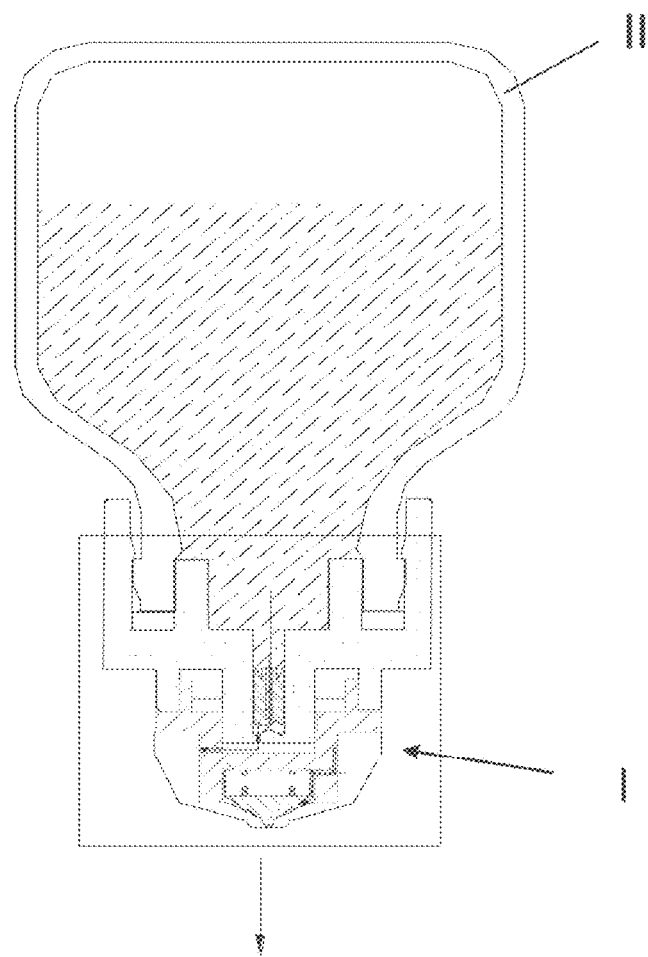
FIG. 6a illustrates an example of a pump head on a storage vessel, such as on a squeeze bottle.
Figure 6B:
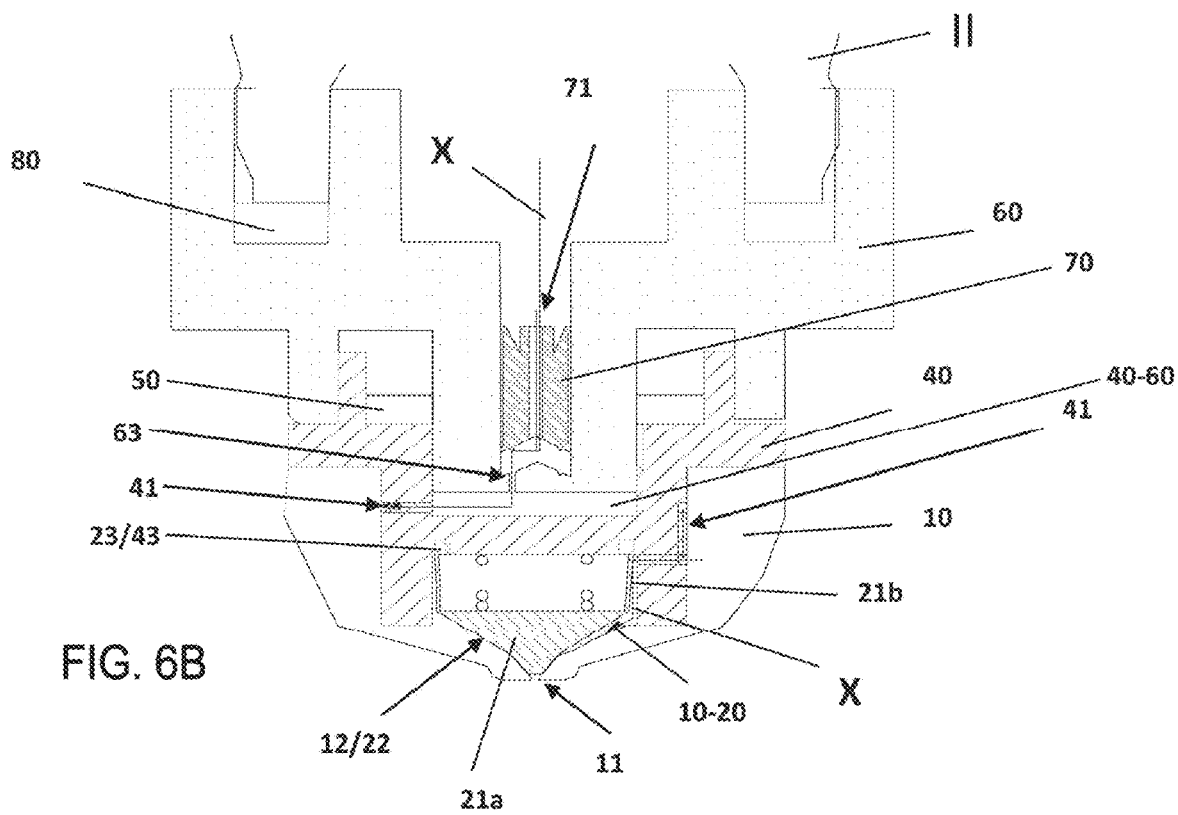
FIG. 6b illustrates the detail of the pump head.

FIG. 6a shows a pump head I in accordance with FIG. 5 that is shown on a storage vessel II, on a squeeze bottle in the case of FIG. 6a. The storage vessel II here comprises a fluid to be dispensed that is shown hatched in the storage vessel II in FIG. 2a. FIG. 6a shows a section through the total arrangement in the state of use; FIG. 6b shows the detail of the pump head I framed in FIG. 2a. The same reference numerals are used here as shown in FIG. 1. In FIG. 6b, the path of the fluid out of the storage container II in the direction of the outlet opening 11 is indicated by an arrow X through the passage channel 71 of the hollow piston 70, through the intermediate region 40-60 between the element 60 and the liner 40, through the passage opening 41, through the intermediate space 10-20 that results on an actuation of the metering apparatus in accordance with FIG. 6b, and finally in the direction of the outlet opening 11.

Figure 7A:
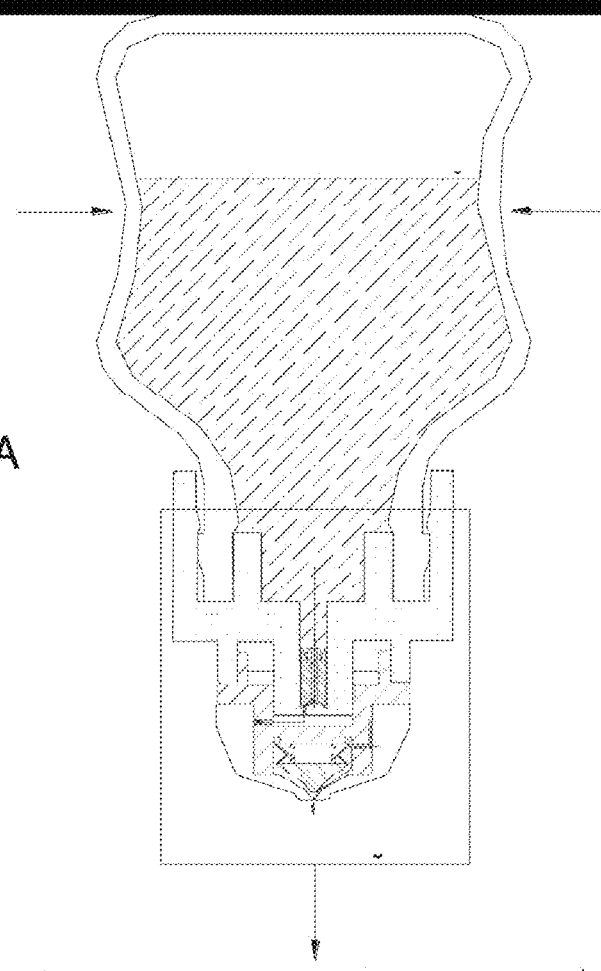
FIG. 7a illustrates an example of a metering apparatus with a pressure applied (as indicated by the arrows) to a squeeze bottle.
Figure 7B:
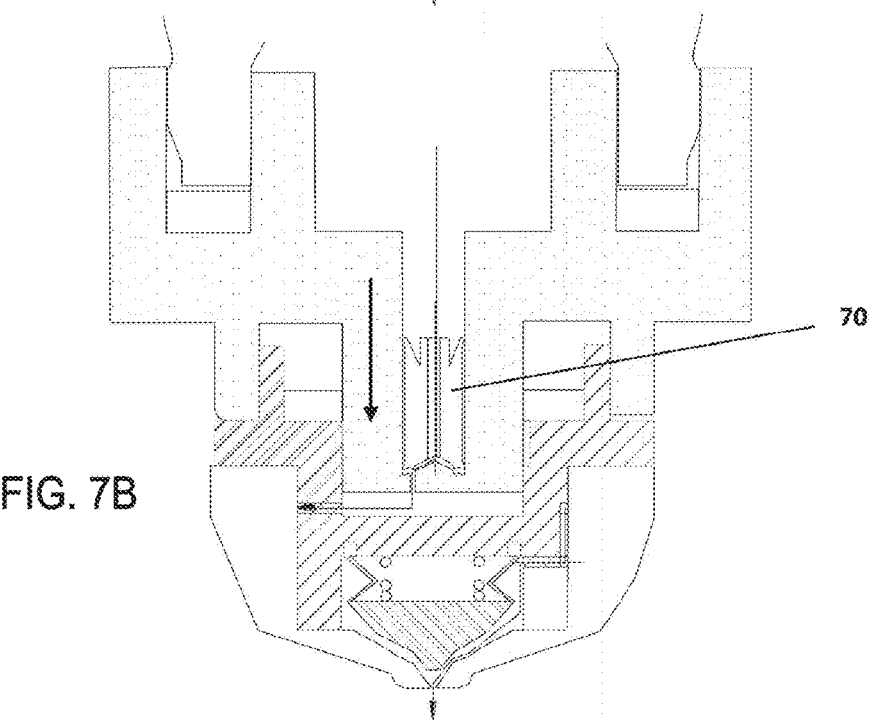
FIG. 7b illustrates the actuation state of the pump head.

FIG. 7a shows the same metering apparatus in accordance with FIG. 6a on an application of pressure (indicated by the arrows) to the squeeze bottle II. In this respect, the hollow piston 70 (see FIG. 7b) is pressed downward (indicated by the arrow to the left of the hollow piston 70) and thus presses the fluid present below the hollow piston 70 and enclosed by the hollow piston 70 and the element 60 through the transit passage 43 of the element 60 into the intermediate space 40-60. No further reference numerals are inserted into FIG. 7b with the exception of reference numeral 70 for reasons of clarity. The fluid 41 is pressed via the transit opening 41 further into the intermediate space 10-20 between the elastic valve 20 and the head part 10 of the pump head I. A deformation of the elastic valve takes place here that, as shown in FIG. 7b, kinks away and thus releases the outlet opening 11 through which the fluid can exit. Due to the fact that the passage channel 71 of the hollow piston 70 and the passage opening 63 of the element 60 are not arranged in a flush manner, a closure of the passage opening 63 takes place on an abutment of the hollow piston 70 at the wall 62 of the element 60. No further exit of a fluid from the metering apparatus is thus possible even on a further application of pressure since the passage channel 63 is closed. A metered dispensing of liquid from a squeeze bottle is thus possible using this pump head I. The state shown in FIG. 7b corresponds to the actuation state (B) of the pump head.

Figure 8A:
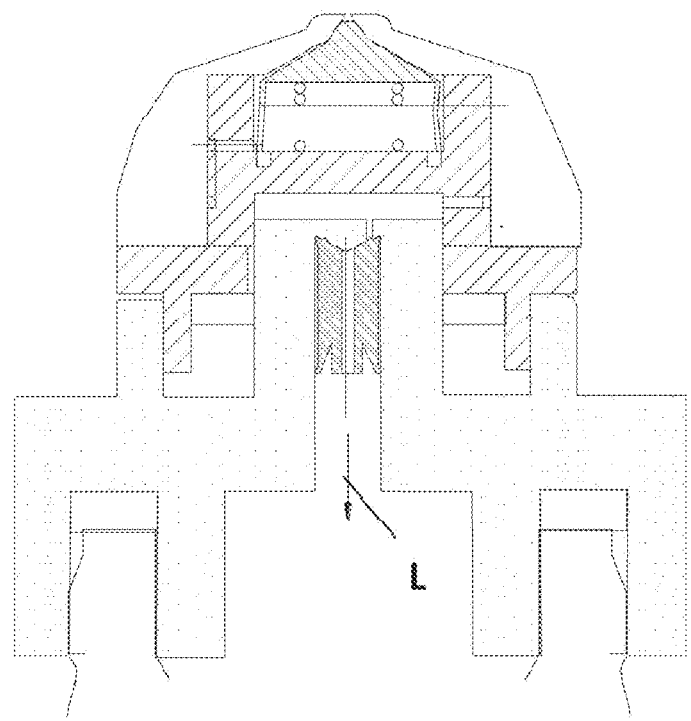
FIGS. 8a and 8b illustrate an example of a pump head of a metering apparatus that transitions from the actuation state into the storage state.
Figure 8B:
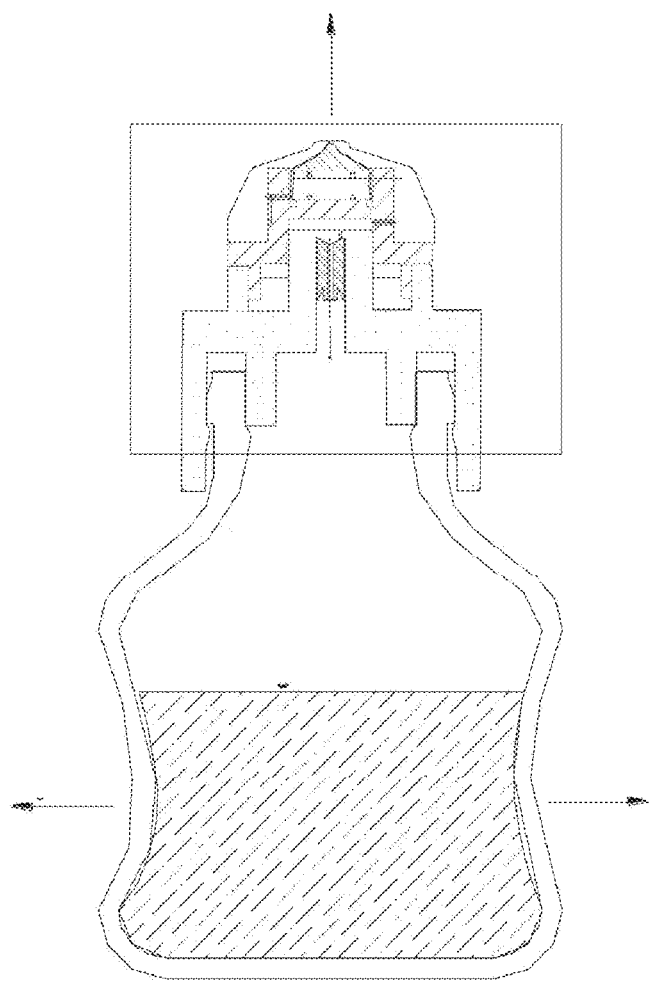

FIG. 8a shows an embodiment in which a transition of the metering apparatus, in particular of the pump head, takes place from the actuation state into the storage state. For reasons of clarify, no reference numerals are shown; however, the same statements apply as in the preceding Figures. FIG. 8a here represents an enlarged detail of the metering apparatus shown in FIG. 8b. As can be seen from FIG. 8a, the hollow piston 70 is still in the end position that it is reached in the actuation state, as shown in FIG. 7b. After the end of the actuation process, the metering apparatus can be transitioned into the storage position by a user, with the metering apparatus being placed on its head in the case of a squeeze bottle in the FIG. 7a. The user in this process releases the squeeze bottle; the squeeze bottle returns to its original shape, as shown in FIG. 6a, due to the return force of the squeeze bottle. The return force is shown by the outwardly facing arrows in FIG. 8b. Due to the removed volume of liquid, a vacuum arises in the storage vessel II in this procedure and said vacuum continues over the hollow piston 70 into the pump head I of the metering apparatus. Air is sucked into the storage vessel 2 via a sterile filter for a pressure equalization. In this process, the hollow piston 70 is also moved back into its starting position, i.e. the hollow piston 70 is moved downward in the case shown in FIG. 8b. An air inlet (arrow L) into the interior of the storage vessel II, i.e. of the squeeze bottle, is possible via the bacterial filter 50 that can be present, for example, between the element 60 and the liner 40.

Figure 9A:
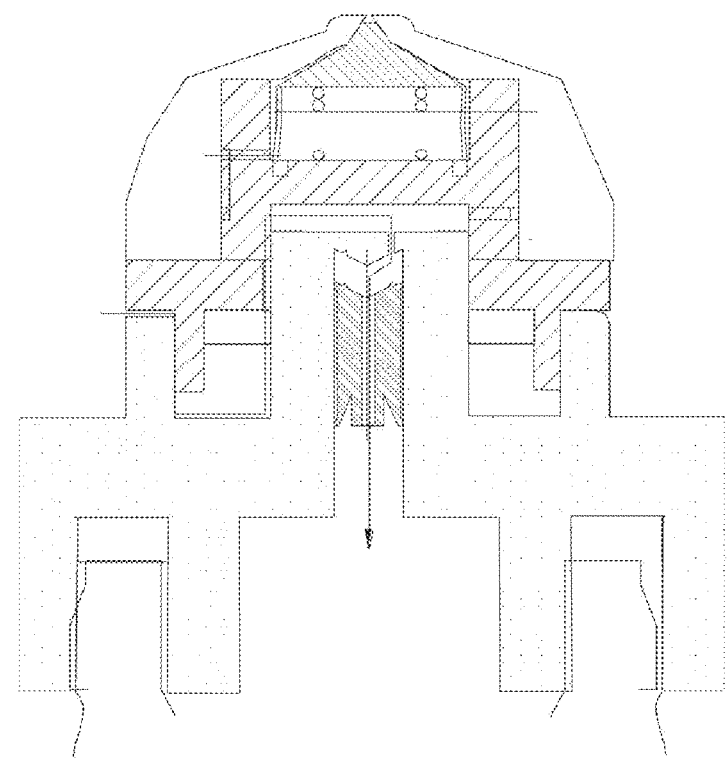
FIG. 9a illustrates an example of a storage position of a bottle in which a hollow piston is shown in its end position.
Figure 9B:
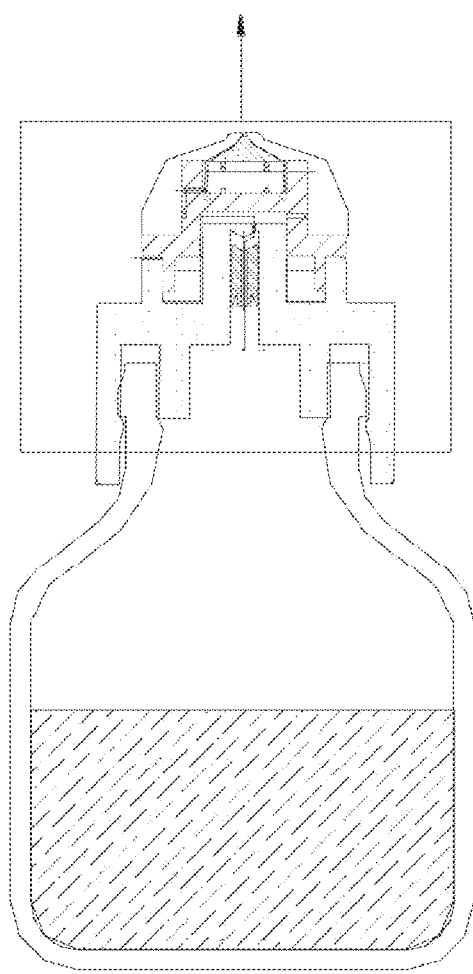
FIG. 9b illustrates when the squeeze bottle is completely relaxed.

FIG. 9a shows the storage position A of the bottle in which the hollow piston 70 is shown in its end position and the squeeze bottle II is completely relaxed (see FIG. 9b).

The invention claimed is:

1. A pump head for a metering apparatus for a metered dispensing of a fluid, the pump head comprising:
   a head part having an outlet opening for the fluid to be dispensed outside the pump head;
   a first element that has a cutout, a wall bounding the cut-out at one side, and a passage opening introduced into the wall that brings the cutout directly or indirectly into fluidic communication with the outlet opening of the head part, with the first element being directly or indirectly connected to the head part in a direction of the wall; and
   a hollow piston having a passage channel that is fit into place in the cutout and is movably guidable up to the wall in the cut-out, wherein the hollow piston is not returned by a spring, wherein the passage channel is arranged in the hollow piston such that the passage opening is closable by the hollow piston on a movement of the hollow piston in the direction of the wall.

2. The pump head in accordance with claim 1, wherein the cut-out and the hollow piston are cylindrical, and wherein the hollow piston is returned by a fluid actuation.

3. The pump head in accordance with claim 1, wherein the passage channel ends in the direction of the wall in an aperture arranged concentrically with respect to an axial projection of the hollow piston;
   wherein the passage channel is guided in a straight line and concentrically with respect to an axial projection of the hollow piston and the passage opening is arranged offset with respect to the aperture.

4. The pump head in accordance with claim 1, wherein the first element comprises at least one means for fixing to a storage vessel, including a latch connection, a snap-in connection, or a thread.

5. The pump head in accordance with claim 1, wherein on a direct connection of the head part to the first element, the head part and the first element comprise means for a direct connection, including a latch connection, a snap-in connection, or a thread.

6. The pump head in accordance with claim 1, wherein the head part and the first element are indirectly connected to one another, with the head part having an inner surface;
   an elastic valve being incorporated that at least regionally has a geometrical configuration corresponding to the inner surface of the head part;
   and a liner being incorporated that has a passage opening for the fluid to be dispensed via which an inflow of the fluid between the head part and the elastic valve is made possible while deforming the elastic valve while forming an intermediate space between the elastic valve and the head part,
   with the head part and the liner being connected with shape matching and a force fit while enclosing an elastic seal between the head part and the liner and the elastic valve lying over the full area with a shape match on the inner surface of the head part in a storage position of the pump head so that a fluidic seal between the head part and the liner is ensured; and
   with the liner being connected at its end remote from the elastic seal to the first element.

7. The pump head in accordance with claim 6, wherein the elastic valve comprises a head and an elastic wall, with the head having a geometrical configuration corresponding to the inner surface of the head part and with the elastic wall being deformable.

8. The pump head in accordance with claim 7, wherein the elastic wall has at least one desired kink point at which the elastic wall kinks down or in on a transition from a storage state into an actuation state.

9. The pump head in accordance with claim 7, wherein the elastic wall is formed from a film of an elastically deformable material, including a thermoplastic, rubber and/or silicone, having a thickness of 0.03 to 1 mm; and/or in that the head is massive.

10. The pump head in accordance with claim 7, wherein the head and the elastic wall are formed in one piece and are simultaneously manufactured by an injection molding process.

11. The pump head in accordance with claim 6, wherein the elastic valve has at least one fixing member via which the elastic valve is connected in a force-locking manner to at least one corresponding fixing member of the liner, with the fixing member of the elastic valve and the fixing member of the liner being formed as a latch connection or as a snap connection.

12. The pump head in accordance with claim 6, wherein the liner has a liner wall that terminates the intermediate space, with a fluidic communication of the intermediate space with a first region disposed at the other side of the liner wall, viewed from the intermediate space being made possible via the passage opening.

13. The pump head in accordance with claim 12, wherein the passage opening is led from the first region directly through the liner wall and opens into a second region, or
is led through a lateral wall of the liner in the first region, is guided in a notch at an outer surface of the liner that can be bounded by the head part and is again led through the lateral wall of the liner in the second region and opens into the first region.

14. The pump head in accordance with claim 6, wherein a spring that effects a return force on the elastic valve is arranged between the elastic valve and the liner, with the return force having the effect that the intermediate space formed in an actuation state is closed while returning to a storage state.

15. The pump head in accordance with claim 6, wherein at least one means for a sterile filtration of inflowing air is present, including a bacterial filter, between the first element and a storage vessel fixable to the first element and/or between the liner and the first element.

16. The pump head in accordance with claim 6, wherein the liner is fixed with respect to the first element.

17. The pump head in accordance with claim 15, wherein on a connection of the pump head via the first element to the storage vessel, a seal is arranged between the first element and the storage vessel.

18. The pump head in accordance with claim 1, wherein the head part comprises an antibacterial material, including metals or metal ions, including silver particles or silver ions.

19. The pump head in accordance with claim 1, wherein the first element is connected to a storage vessel.

20. The pump head in accordance with claim 19, wherein the storage vessel is configured as a squeeze bottle.

* * * * *